Patented Nov. 20, 1951

2,575,599

UNITED STATES PATENT OFFICE 2,575,599

CONCRETE HARDENING COMPOSITIONS OF THE METAL SALT TYPE

Isador Silverman, Newark, and Abraham Moscowitz, Nutley, N. J., assignors to L. Sonneborn Sons, Inc., a corporation of Delaware No Drawing. Application September 30, 1950, Serial No. 187,816

11 Claims. (Cl. 106—12)

This invention relates to new and useful improvements in concrete hardening compositions of the metal salt type.

U. S. Patent 2,203,302 discloses aqueous concrete hardening solutions comprising an aqueous solution of at least one water-soluble metal salt concrete hardener and an alkali metal water-soluble petroleum sulfonate, or a water-soluble petroleum sulfonic acid, the hydrocarbon nucleus of which possessing in open chain configuration, not more than 18 and not less than 10 carbon atoms, said sulfonate or sulfonic acid being present in amount and potency sufficient to reduce the normal surface tension of the said concrete hardening salt solution to at least 45 dynes per cm. at 80° F.

The above mentioned concrete hardening solutions in the case of many lime reactive salts, as for instance water-soluble metal fluosilicates, tend to hydrolyze. This tendency to hydrolysis is undesirable because the products of hydrolysis are in many cases insoluble, and of colloidal order of particle size, which tend to clog the pores of the concrete surface to be hardened and to prevent penetration of the hardening solution. To overcome the tendency to hydrolysis, it is necessary to add inorganic acids to the solution, i. e. to lower the pH. In the cases of many salts such as metal fluosilicates, it has been impossible to resort to such reduction of pH by adding the inorganic acids to the dry salts, because of reaction between the acids and the salt forming hydrofluosilic acid. The latter is highly volatile and is normally a highly corrosive gas, which would introduce serious packaging, storage and handling difficulties.

One object of this invention is a concrete hardening composition which can be prepared and shipped in a dry, stable form and can easily be dissolved in water to form aqueous non-hydrolyzing solutions of low surface tension.

In accordance with the invention urea sulfate, which is incapable of reacting with the concrete hardening metal salt in the dry state, but capable of releasing its acidity by dissociation in water, is mixed with the dry concrete hardening metal salt. A wetting agent is then incorporated into the dry mixture. We have found that the resulting dry composition is stable, may be stored for indefinite periods, yielding with the addition of water in effect a self pH adjusting, non-hydrolyzing aqueous solution in any concentration. The water-soluble metal concrete hardening salt may be any salt capable of reacting with the lime liberated in the hydration of Portland cement, said lime being invariably present on the surface of Portland cement concrete and is therefore available for reaction with the aqueous solution contacting it. Examples of such soluble metal salts are magnesium fluosilicate, calcium fluosilicate, copper and iron fluosilicate and zinc fluosilicate. The wetting agent may be any of the known wetting agents which are stable in the presence of electrolytes, as for example oleyl alcohol condensed with 20 mols of ethylene oxide, generally known and sold as "Emulphor O," polyethylene glycols, polyethylene glycol esters and polyethylene glycol ethers. The wetting agents may be added in the form of aqueous solutions preferably at 30–35% concentration.

Ordinarily when the concrete hardening salt is applied to a concrete surface in the form of an aqueous solution the latter may contain concentrations of the salt ranging between 10 and 25%. Particular conditions may require concentrations. Within the range of concentration normally required for maximum hardening effect, the amount of wetting agent necessary to reduce the surface tension of the solution to at least 45 dynes per cm. is rarely in excess of 0.5% by weight of the dry composition. Thus, in actual use a non-hydrolyzing stock solution of any desired concentration is made up by dissolving the composition of the invention in water. Alternatively, the composition of this invention may be used to make up solutions of various concentration ready for use merely by decreasing the amount of the dry mix to be added to a given amount of water. The stock solution may be diluted for use with varying amounts of water, depending upon the conditions presented by the particular density or porosity of the concrete surface which it is desired to harden.

The urea sulfate should be present in amount sufficient to lower the pH of the solution formed to at least 2.0 and preferably to 1.7. Stoichiometrically urea sulfate contains 62% sulfuric acid. We have found that it is preferable to operate with a lower percentage of acid to assure a dry mix since the full content of acid tends to keep the mix damp. 25–50% sulfuric acid is preferred.

The following examples are furnished by way of illustration but not of limitation:

EXAMPLE I

Various percents by weight of urea sulfate as shown in column 1 of the table were added to magnesium fluosilicate crystals. Batches of these mixtures were made up with urea sulfate containing 45% sulfuric acid, urea sulfate containing 35% sulfuric acid, and urea sulfate containing 25% sulfuric acid. Each of these dry compositions was then added to water to form a 20% solution. The pH of each of these solutions was then tested. Results are shown in the table below.

Table

| Urea Sulfate Content in dry mix, by weight | pH of 20% Solutions based on MgSiF$_6$ 6H$_2$O with Urea Sulfate containing— | | |
|---|---|---|---|
| | 45% H$_2$SO$_4$ | 35H H$_2$SO$_4$ | 25% H$_2$SO$_4$ |
| | pH | pH | pH |
| 1% | 1.8 | 1.8 | 2.2 |
| 2% | 1.5 | 1.75 | 1.9 |
| 3% | 1.4 | 1.6 | 1.8 |
| 4% | 1.4 | 1.6 | 1.7 |
| 5% | 1.4 | 1.5 | 1.7 |
| 6% | 1.35 | 1.45 | 1.6 |

EXAMPLE II 4 lbs. of urea sulfate were mixed with 95½ lbs. of dry magnesium fluosilicate crystals. Into this mixture was incorporated ½ lb. of dry anhydrous sodium green petroleum sulfonate. When 2 lbs. of the total composition was dissolved in 1 gallon of water a clear, non-hydrolyzing solution was obtained, having a pH of 1.5 and a surface tension of 37 dynes per cm.

EXAMPLE III 4 lbs. of urea sulfate were mixed with 95½ lbs. of dry zinc fluosilicate. Into this mixture was mixed ½ lb. of a 33⅓% "Emulphor O" solution. When 2 lbs. of the total composition was dissolved in 1 gallon of water a clear, non-hydrolyzing solution was obtained having a pH of 1.5 and a surface tension of 37 dynes per cm.

Examples II and III were repeated using calcium fluosilicate and copper and iron fluosilicate in turn. Comparable results were obtained. Tetraethylene glycol was substituted for Emulphor O in Example II. Comparable results were obtained.

Polyethylene glycols, polyethylene glycol esters and polyethylene glycol ethers may be substituted for the wetting agents used in Examples II and III and comparable results will be obtained.

This invention is limited by the appended claims, or their equivalents.

We claim:

1. A concrete hardening composition in dry form for the preparation of a non-hydrolyzing aqueous solution thereof by the addition of a predetermined amount of water comprising at least one water soluble metal salt concrete hardener, urea sulfate in amount sufficient to lower the pH of the concrete hardening solution to be formed to at least 2, and a wetting agent stable in solution at a pH not exceeding 2 in amount sufficient to reduce the surface tension of a concrete hardening solution to be formed to at least 40 dynes per centimeter.

2. A concrete hardening composition in accordance with claim 1 in which said metal salt is a metal fluosilicate.

3. A concrete hardening composition in accordance with claim 2 in which said soluble metal salt is at least one member of the group consisting of magnesium fluosilicate, calcium fluosilicate, copper and iron fluosilicate and zinc fluosilicate.

4. A concrete hardening composition in accordance with claim 3 in which said metal salt does not substantially exceed 98% by weight of the total dry composition.

5. A concrete hardening composition in accordance with claim 1 in which said wetting agent is at least one member of the group consisting of green petroleum sulfonates, oleyl alcohol condensed with 20 mols of ethylene oxide, polyethylene glycols, polyethylene glycol esters, and polyethylene glycol ethers.

6. A concrete hardening composition in accordance with claim 5 in which said wetting agent does not substantially exceed 0.5% of the total weight of the dry composition.

7. A concrete hardening composition in accordance with claim 1 in which said soluble metal salt is a metal fluosilicate, and said urea sulfate contains 25–45% sulfuric acid, and is present in amount of 1–6% by weight of the dry composition.

8. A concrete hardening composition in accordance with claim 7 in which said urea sulfate contains 45% sulfuric acid and is present in amount of 2–4% by weight of the dry composition.

9. A concrete hardening composition in accordance with claim 8 in which said wetting agent is at least one member of the group consisting of green petroleum sulfonates, oleyl alcohol condensed with 20 mols of ethylene oxide, polyethylene glycols, polyethylene glycol esters and polyethylene glycol ethers.

10. A concrete hardening composition in accordance with claim 9 in which said wetting agent is present in amount not substantially exceeding 0.5% of the weight of the dry composition.

11. A concrete hardening composition in accordance with claim 10 in which said wetting agent is oleyl alcohol condensed with 20 mols of ethylene oxide and is present in a 30–35% aqueous solution.

ISADOR SILVERMAN.
ABRAHAM MOSCOWITZ.

REFERENCES CITED

The following references are of record in the file of this patent:

UNITED STATES PATENTS

| Number | Name | Date |
|---|---|---|
| 2,203,302 | Liberthson | June 4, 1940 |

Certificate of Correction

Patent No. 2,575,599                                                   November 20, 1951

ISADOR SILVERMAN ET AL.

It is hereby certified that error appears in the printed specification of the above numbered patent requiring correction as follows:

Column 2, line 20, after "require" insert *higher*;

and that the said Letters Patent should be read as corrected above, so that the same may conform to the record of the case in the Patent Office.

Signed and sealed this 19th day of February, A. D. 1952.

[SEAL]

THOMAS F. MURPHY,
*Assistant Commissioner of Patents.*